Aug. 5, 1958  T. W. MACAULAY  2,845,713
GLASS CUTTING TABLES
Filed July 29, 1955  3 Sheets-Sheet 1

T. W. MACAULAY
INVENTOR.
BY Llewellyn A. Young
His Attorney

Aug. 5, 1958     T. W. MACAULAY     2,845,713
GLASS CUTTING TABLES

Filed July 29, 1955     3 Sheets-Sheet 2

T. W. MACAULAY
INVENTOR.

BY Llewellyn A. Young
His Attorney

Aug. 5, 1958        T. W. MACAULAY        2,845,713
GLASS CUTTING TABLES
Filed July 29, 1955                                  3 Sheets-Sheet 3
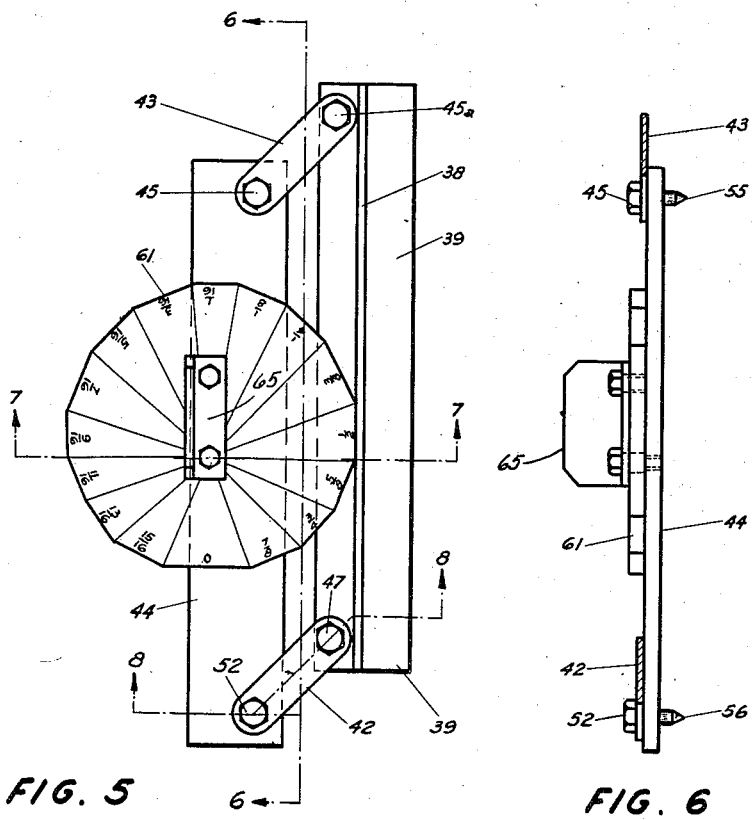
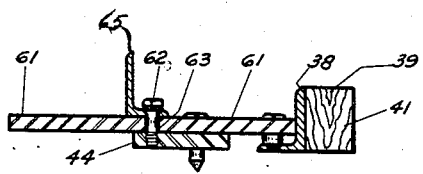
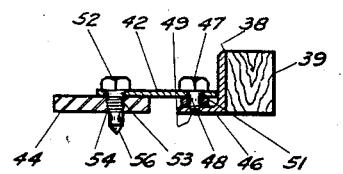
T. W. MACAULAY
INVENTOR.

United States Patent Office 2,845,713
Patented Aug. 5, 1958

2,845,713

GLASS CUTTING TABLES

Thomas W. Macaulay, Reno, Nev.

Application July 29, 1955, Serial No. 534,019

8 Claims. (Cl. 33—32)

This invention relates to glass cutting tables.

An object of this invention is the provision of a table of the above character in which a plurality of panes of glass of the same dimensions may be cut from larger pieces of glass in a minimum of time and with a minimum of manual manipulation.

Another object of the invention is the provision of a table of the above character with means whereby one or more pieces of glass may be cut to the same length and width dimensions without changing the position of the glass holding and measuring means on the table.

Another object of the invention is the provision of a table of the above character in which a multiplicity of panes of glass may be cut to pre-selected dimensions without first removing any of the cut panes from the table.

Another object of the invention is the provision in a table of the above character of a mounting base which may also be used as a storage space for removable component parts of the glass cutting table.

Another object of the invention is the provision in a table of the above character of novel adjustment means for limitedly adjusting the relative position of the glass holding, or positioning, means with respect to the cutter guide straight edge.

Another object of the invention is the provision of a table of the above character with novel means for catching strips of glass that are removed when a pane of pre-selected dimensions is cut from a larger piece of glass.

Another object is the provision of a table of the above character that is simple to construct, that is rugged, and that is inexpensive to produce.

Other objects and advantages of the invention will become apparent upon reference to the accompanying drawings in which:

Figure 5 is an enlarged view of the glass positioning and holding means, showing details of construction.

Figure 6 is a sectional view taken substantially along the line 6—6 in Figure 5.

Figure 7 is a sectional view taken substantially along the lines 7—7 in Figure 5.

Figure 8 is a sectional view taken substantially along the line 8—8 in Figure 5.

Figure 1:
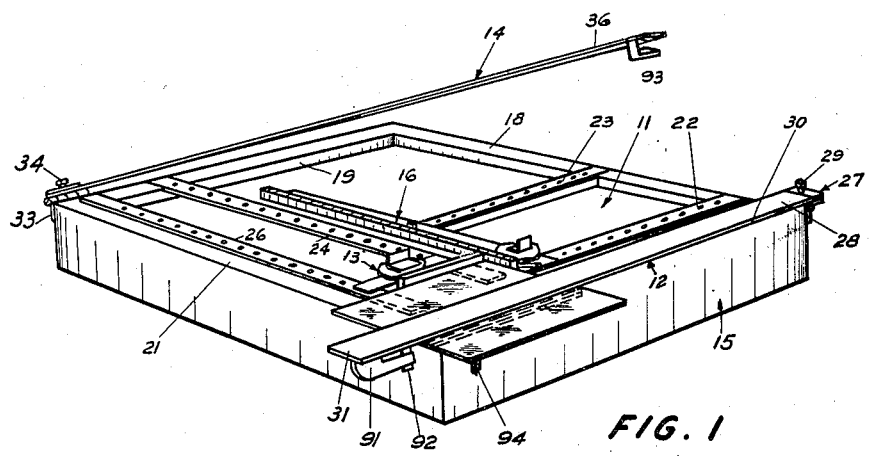
Figure 1 is a perspective view of a glass cutting table embodying the present invention.

Referring now to the drawings, the invention is shown embodied in a glass cutting table for cutting one or more pieces or panes of glass, in superimposed relation, to pre-selected dimensions. In general the table includes a top, indicated generally as 11; a straight edge 12; an abutment 13 for positioning and holding the glass in a fixed position on the table relative to the straight edge 12 so that the piece or pieces of glass may be cut along a pre-selected line determined by the straight edge 12; a straight edge 14 substantially at right angles to the straight edge 12; an abutment 16, substantially at right angles to the abutment 13, for positioning and holding the piece or pieces of glass on the table against movement relative to the straight edge 14 so that the piece or pieces of glass may be cut along a predetermined line determined by the straight edge 14.

Figure 2:
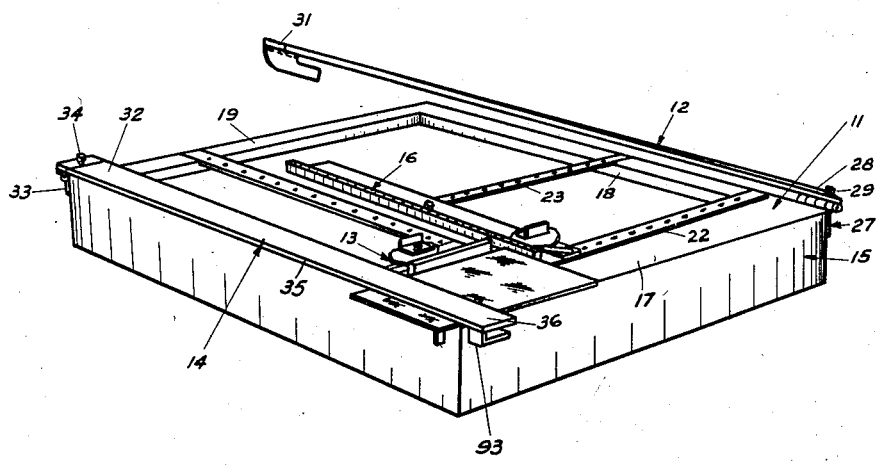
Figure 2 is a view similar to Figure 1 with the cutter guide edges in different positions.

The table top 11 may have any configuration so long as it supports one or more panes of glass in a superimposed relation. As best seen in Figures 1 and 2, the glass cutting table is formed on the top of a rectangular shaped box-like structure defining a base 15. Disposed on top of the base 15 are raised edges 17, 18, 19 and 21 all of the same height. Between the raised edges 17 and 19 are ribs 22 and 23 parallel therewith, and between the edges 18 and 21 are ribs 24 and 26 parallel therewith. The top surface of the edges 17, 18, 19 and 21 and of the ribs 22, 23, 24 and 26 are all disposed in a common plane to define a glass-supporting table top. The aforegoing members may be formed from any suitable material such as wood, metal or other materials, or combinations of these.

Figure 3:
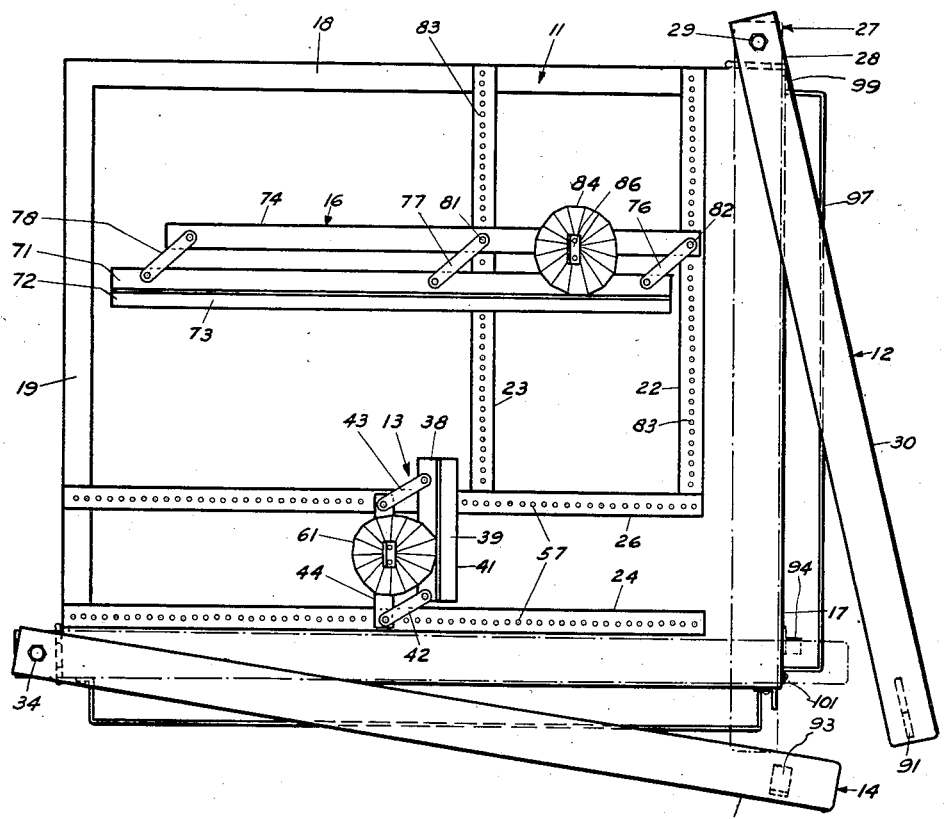
Figure 3 is a top view of the table with glass catching trays in position on the table.

The straight edge, or cutter guide, 12, as shown in Figures 1 and 2, is mounted to overlie the raised edge 17 and has a mounted end 28 and a free end 31. The straight edge may be formed of any suitable material and in this instance is shown as a flat member having an elongated rectangular cross section. An outward facing side surface 30 is shaped to act as a guide surface for a glass cutting tool. A hinge 27 is disposed between the end 28 of the straight edge 12 and the box-like structure 15. The hinge 27, as shown in Figure 3, is secured to the end 28 by a single thumb screw 29. With this construction the free end 31 of the straight edge 12 may be moved between the position shown in Figures 1 and 2 about the axis of the hinge, and between the solid line position and the dotted line position, as shown in Figure 3, about the axis of the screw 29. The respective positions shown in Figures 2 and 3 do not indicate the extreme limits of movement of the straight edge 12, but show that the straight edge 12 may be moved out of the way while a piece of glass is placed on the table and positioned. The straight edge 12 is positioned by the hinge 27 and engagement of a stop 91 on the free end of the straight edge with shoulder 92 on the base 15. As shown in Figures 1 and 2, the stop 91 is on the underside of the straight edge and is spaced from the straight edge a sufficient distance to permit reception of an edge of a piece of glass that is being cut off. The shoulder 92 as shown is in the form of an angle iron mounted to have one side project outward from the base a sufficient distance to be engaged by the stop 91.

The straight edge, or cutter guide, 14 is of a construction similar to the straight edge 12 and has a mounted end 32, a glass cutter guide surface 35 and a free end 36. As shown, the straight edge 14 is mounted adjacent the edge 21 and has the end 32 secured to the box-like structure 15 by a hinge 33. The end 32 is secured to the hinge by a single thumb screw 34 so that the free end 36 may swing about the hinge axis, as shown in Figures 1 and 2, and is pivotable about the axis of the screw 34 as shown by the solid and dotted line positions of the straight edge 14 in Figure 3. With this construction the straight edge 14 may also be moved out of the way while panes of glass are being placed and positioned on the table. The straight edge 14 is positioned by the hinge 33 and a stop 93 and a shoulder 94 on the base 15. The stop 93 and the shoulder 94 are constructed in substantially the same manner as the stops 91 and 92 for the straight edge 12.

As is readily apparent to those versed in the art of glass cutting, the glass positioning and holding means, or abutment, 13 may have many shapes, but for purposes of illustration herein (see Figures 5, 6, 7 and 8) it is formed in this instance by an angle iron member 38 faced with a wooden strip 39 having a straight edge 41, links 42 and 43, and a base member 44. The link 42 has one end pivotally secured to a toe 46 of the member 38 as by a screw 47 extending through an opening 48 of the link 42 and received in a threaded opening 49 in the toe 46 of the member 38. As can be seen, the base 44 is thicker than the toe 46, consequently a spacing washer 51 is disposed between the toe 46 and the link 42 to maintain the link 42 in a substantially horizontal position in the assembly. At its opposite end the link 42 is pivotally attached to the base member 44 by a screw 52 extending through an opening 53 formed in the link and received in a threaded opening 54 in the base member 44. The link 43 is attached to the members 38 and 44 in a similar manner as by screws 45 and 45a. The base member 44 is held in a desired position by the end 56 of screw 52, and the end 55 of the screw 45. The ends 56 and 55 in effect define pegs shaped to be received in openings 57 (see Figure 3) formed in ribs 24 and 26 respectively. The openings 57 face upwardly and are spaced apart at suitable predetermined intervals.

It is apparent with this construction that by pre-selecting the openings 57 in which the pegs 55 and 56 are received the glass engaging surface 41 on the abutment 13 may be positioned at pre-selected positions relative to the straight edge 12 so that pre-selected lengths of glass may be cut. By moving the pegs 55 and 56 from one pair of holes 57 to an adjacent pair of holes it is apparent a different length of glass may be cut, the length differing by the distance between the centers of the holes.

Provision is also made in this construction for limitedly adjusting the position of the abutment 13 relative to the straight edge 12 for any pre-selected position of the base member 44. This is accomplished herein by an eccentric dial or cam 61, the base member 44, and the member 38. As pointed out herein, the member 38 is connected to the base member 44 by the links 42 and 43 which permit relative movement between the parts.

The dial 61 is mounted on the base member by a pin 62 extending through an opening 63 formed in the dial and received in a threaded opening in the base member 44 at a position between the links 42 and 43. The pin 62 thus defines an axis for the cam 61. As seen, the cam 61 engages the member 38 and positions the member 38 with respect to the base member 44. By preshaping the periphery of the cam 61 with a plurality of straight, or flattened surfaces, all at different distances from the axis of rotation, the cam becomes an eccentric and it is seen that the member 38 may be moved to any desired position with respect to the base member 44, within the limits of movement of the two members. In practice I place the holes 57 one inch apart and preshape the periphery of the cam 61 so that the member 38 may be moved relative to the base member 44 by gradations as small as 1/16 of an inch. The flattened edges of the cam 61 assure the operator that the member 38 and in turn the glass abutting surface 41 positively remain in a fixed position relative to the base member 44. The dial 61 may be rotated by finger piece 65 defining a dial-turning knob or handle.

The glass-positioning abutment 16 is constructed similarly to abutment 13 and is comprised of an angle iron member 71 faced with member 72 having a straight edge 73. The member 71 is attached to base member 74 by links 76 and 77 and 78. Each link is pivotally secured to the base member 74 and the member 71 in a manner similar to that described in the construction concerning abutment 13. Threaded pins 81 and 82 securing the ends of links 77 and 76 respectively to the base member 74 also are shaped to extend through the base member 74 and be received in holes 83 formed in ribs 22 and 23. A cam member 84 is secured to the base member as by a pin 86 in the manner described for the cam 61 and is shaped to have its peripheral edge engage the member 71 so as to hold the straight edge 73 in a pre-selected position relative to the base member 74. The cam 84 is preferably calibrated in a manner similar to that described for cam 61 so that the position of the edge 73 of the abutment may be moved to any pre-selected position within the limits of design, relative to the base member 74.

The base 15 also defines a storage chamber for the component parts of the table. This is desirable when the table is transported. It is apparent that the straight edges 12 and 14, the glass holding and positioning members, glass receiving trays, and the legs (not shown) which may be used to support the base, may all be enclosed in the base. This makes a practical and easy way to store and transport this glass cutting table.

Figure 4:
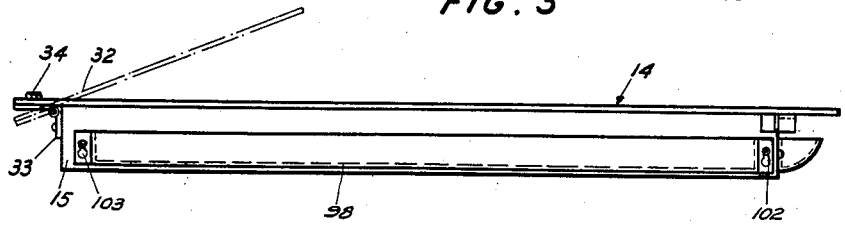
Figure 4 is an end view of Figure 3.

Novel means is also provided for catching glass strips cut from larger pieces of glass. For this purpose elongated trays 97 and 98 are detachably secured to the base 15 beneath the straight edge 12 and the straight edge 14, respectively, as by keyhole slots in the ends of the trays and spaced, headed pins 99 and 101, and 102 and 103, respectively, projecting outward on adjacent sides of the base 15, as best seen in Figures 3 and 4.

The operation of the table is readily apparent from the drawings, but may be summarized as follows: Assume that it is desired to cut a small size pane of glass out of a larger piece. The operator positions the pegs 81 and 82 on the base member 74 in the proper holes 83 and rotates the cam 84 until the glass engaging edge 73 is the proper distance from the cutter guide edge 35, this being determined by the length of the pane of glass being cut. In a like manner the pegs 55 and 56 on the base member 44 are placed in the proper holes 57 in the ribs 24 and 26 and the dial 61 is adjusted so that the glass engaging edge 41 is the proper distance from the cutter guide edge 30, this being determined by the width of the pane of glass being cut. The straight edges 12 and 14 are swung up and out of position. The piece of glass is placed on the table and the straight edge 12 is swung down into position on the glass so that cutter guide edge 30 is parallel with the edge 41 and the stop 91 engages the shoulder 82. A cut is then made along the edge 30. The straight edge 12 is moved out of the way and the straight edge 14 is swung into position so that the cutter guide edge 35 is parallel with the glass abutting edge 73 and the stop 93 engages the shoulder 94. A cut is then made along the edge 35. In the case of each cut, the strip of glass removed falls into the glass receiving trays. When the latter are filled, the trays may be removed and the glass strips thrown into larger waste containers.

If it is desired to cut several more panes of glass to the same dimensions the operator moves both straight edges 12 and 14 out of the way and places another pane of glass on the table. The cut pane may or may not be removed before the second pane of glass is placed on the table. To save time, the operator may place the second piece of glass on top of the cut pane so that the pieces of glass are in side by side relation. As soon as the second piece of glass is in position the operator makes the cuts along the straight edges 12 and 14 as described before. It is readily apparent that a comparatively large number of panes of glass may be cut in the manner described before it is necessary to remove them from the table.

From the foregoing it is readily seen that through the use of the table shown a plurality of panes of glass of the same dimensions may be cut with a minimum of manual movement, in a minimum of time.

I claim:

1. In a table for cutting one or more pieces of glass the combination of a table top for supporting said glass, a first straight edge, first hinge means for mounting one end of said first straight edge on said table top and having the opposite end free to move toward and away from the table top, a first abutment coacting with said first straight edge to hold said glass in fixed relation to said first straight edge, means for holding said first abutment at pre-selected distances from said first straight edge, means acting between said holding means and said abutment for limitedly adjusting the position of the abutment relative to said holding means, a second straight edge at an angle to said first straight edge, second hinge means for mounting one end of said second straight edge on said table top and having the opposite end free to move toward and away from the table top, a second abutment operatively associated with said second straight edge to hold said glass in fixed relation to said second straight edge, means for holding said second abutment at pre-selected distances from said second straight edge and means acting between said last mentioned holding means and said second abutment means for limitedly adjusting the position of the second abutment means relative to said last-mentioned holding means.

2. In a glass cutting table the combination of a table having a top for supporting panes of glass, a first straight edge, means for mounting said first straight edge on said table to permit said straight edge to swing about an edge of said table between positions in which said straight edge overlies said top in superimposed relation to said top whereby the straight edge may be used as a guide for a glass cutter, and a position in which said straight edge is inclined at an angle to said top to permit placing of pieces of glass to be cut on the table and removal of the glasses that have been cut from the table, said means permitting one or more pieces of glass to rest on said top in superimposed relation, means for positively holding said one or more pieces of glass in a pre-selected position relative to said first straight edge, a second straight edge at an angle to said first straight edge, means for mounting said second straight edge on said table to permit said second straight edge to swing about an edge of said table between positions in which said straight edge overlies said top in superimposed relation whereby the second straight edge may be used as a guide for a glass cutter and a position in which said second straight edge is inclined at an angle to said top to permit placing of pieces of glass to be cut on the table and removal of the glasses that have been cut from the table, said means permitting one or more pieces of glass to rest on said top in superimposed relation, and means for positively holding said one or more pieces of glass in a pre-selected fixed position relative to said second straight edge, said first and second glass holding means and said first and second straight edges arranged whereby a plurality of panes of glass of the same size may be cut with one setting of the holding means and selectively swinging said straight edges between their opposed positions.

3. The combination recited in claim 2 with side portions on said table top which define a base for said top when the table is being used for glass cutting, and define sides of a box for storing the straight edges when the table is being transported.

4. In a glass cutting table the combination of a table having a glass supporting top for supporting a piece of glass, said top having a first pair of opposed sides and a second pair of opposed sides, a first straight edge having opposite ends, said straight edge extending across said table to have an end adjacent each side of one of said pairs of opposed sides, hinge means adjacent one side of one of said pairs of sides for mounting an end of said first straight edge on said table to permit said straight edge to be moved between positions in which said straight edge overlies said top whereby the straight edge may be used as a guide for a glass cutter and a position in which said straight edge is inclined at an angle to said table top, means mounted on the table on the other side of said first pair of sides engageable with said other end of the first straight edge to position the straight edge on the table, first glass positioning means adapted to coact with said first straight edge to hold a piece of glass in a fixed position relative to said first straight edge, a second straight edge at an angle to said first straight edge and having opposite ends, said second straight edge extending across said table to have an end adjacent each side of said other pair of sides of said table, second hinge means adjacent one side of said other pair of sides for mounting one end of said second straight edge on said table to permit said second straight edge to be moved between positions in which said second straight edge overlies said top whereby the second straight edge may be used as a guide for a glass cutter and a position in which said second straight edge is inclined at an angle to said table top, means mounted on the table on the other side of said other pair of sides engageable with said other end of said second straight edge to position said second straight edge on the table top, and second glass holding and positioning means adapted to coact with said second straight edge to hold a piece of glass in fixed position relative to said second straight edge.

5. In a glass cutting table the combination of a table having a top for supporting at least one piece of glass, first hinge means on said table, a straight edge extending across said top and having an end mounted on said hinge means and a free end movable about said hinge means as an axis between a position in which said straight edge is in side by side superimposed relation with said top and a position in which said free end is spaced from the said table top to permit placing of glass on the top and the removal of cut glass therefrom, first glass positioning means operatively associated with said first straight edge to hold pieces of glass in superimposed position relative to said first straight edge, means for holding said first glass positioning means at pre-selected distances from said first straight edge, a second hinge means on said table, a second straight edge at an angle to said first straight edge, said second straight edge extending across said top and having an end mounted on said second hinge means, and an end free to move about said second hinge means as an axis between a position in which said straight edge is in side by side superimposed relation with said top and a position in which said end is spaced from said table top to permit placing of glass on the top and removal of cut pieces therefrom, a second glass positioning means operatively associated with said second straight edge to hold pieces of glass in superimposed position relative to said second straight edge, means for holding said second glass positioning means at pre-selected distances from said second straight edge, said first and second straight edges being selectively movable between their respective positions whereby with one setting of said first and second glass positioning means a plurality of panes of glass of the same size may be cut by movement of said first and second straight edges between their respective positions without changing the first and second glass positioning means.

6. In a glass cutting table the combination of a table top for supporting a pane of glass, a first straight edge, first hinge means for mounting one end of said first straight edge on said table and to have the opposite end free to move between a position in which the straight edge overlies the table and a position in which the straight edge is inclined with respect to the top of the table, first glass holding means for holding a pane of glass in fixed position relative to said first straight edge, first adjustable means for pre-determining the position of glass on said table whereby a piece of glass may be cut to a pre-selected length, a second straight edge at an angle to said first straight edge, second hinge means for mounting one end of said second straight edge on said table and to have the opposite end free to move between a position in which the straight edge overlies the table and a position in which the straight edge is inclined with respect to the top of the table, second glass holding means for holding a pane of glass in fixed position relative to said second straight edge, and second adjustable means for pre-determining the position of glass on said table whereby a piece of glass may be cut to a pre-selected width.

7. In a glass cutting table for supporting one or more pieces of glass in superimposed relation the combination of a table top for supporting said one or more pieces of glass having a first edge and a second edge at an angle to said first edge, said table top having at least two rows of spaced holes in substantially perpendicular relation to said first edge, and having at least two rows of spaced holes in substantially perpendicular relation to said second edge, a first straight edge mounted to be adjacent said first edge, means for mounting one end of said first straight edge to have its opposite end movable between a position in which said straight edge is inclined to the top of said table and a position in which said straight edge overlies and is in superimposed relation to said top, first glass positioning means adapted to hold at least one piece of glass in fixed relation with said straight edge, first spaced pegs adapted to be received in said spaced holes in perpendicular relation to said first edge, means between said pegs and said first glass positioning means for limitedly adjusting the position of said glass positioning means between pre-selected positions between the holes in which said pegs are received and an adjacent pair of holes, a second straight edge mounted to be adjacent said second edge, means for mounting one end of said second straight edge to have its opposite end movable between a position in which said straight edge is inclined to the top of said table and a position in which said second straight edge overlies and is in superimposed relation to said top, second glass positioning means adapted to hold at least one piece of glass in fixed relation with said second straight edge, second spaced pegs adapted to be received in said spaced holes in perpendicular relation to said second edge, means between said second spaced pegs and said second glass positioning means for limitedly adjusting the position of said second glass positioning means between pre-selected positions between the holes in which said second pegs are received and an adjacent pair of holes.

8. In a glass cutting table the combination of a table top for supporting a pane of glass, said top having a first edge and a second edge at an angle to said first edge, said table top having a first series of holes spaced progressively away from said edge and a second series of holes spaced progressively away from said second edge, a first straight edge adjacent said first edge, means for mounting said first straight edge for movement between a position in which the straight edge overlies the top and a position in which said straight edge is inclined at an angle to said top, first glass positioning means adapted to support a piece of glass in fixed relation with said first straight edge, at least one peg adapted to be received in one of said first series of holes, means acting between said peg and glass positioning means to adjust the position of said glass positioning means between pre-selected positions, a second straight edge adjacent said second edge, means for mounting said second straight edge for movement between a position in which the second straight edge overlies the top and a position in which said second straight edge is inclined at an angle to said top, second glass positioning means adapted to support a piece of glass in fixed relation with said second straight edge, at least one peg adapted to be received in one of said second series of holes and means acting between said peg and glass positioning means to adjust the position of said glass positioning means between pre-selected positions.

References Cited in the file of this patent
UNITED STATES PATENTS

| | | |
|---|---|---|
| 318,883 | Dodge | May 26, 1885 |
| 526,299 | Dana | Sept. 18, 1894 |
| 625,005 | Wilkinson | May 16, 1899 |
| 634,836 | Rich | Oct. 10, 1899 |
| 938,741 | Campbell | Nov. 2, 1909 |
| 1,194,936 | Bemis | Aug. 15, 1916 |
| 1,539,704 | Texoon | May 26, 1925 |
| 1,977,213 | Slobey | Oct. 16, 1934 |
| 2,058,091 | Marsella et al. | Oct. 20, 1936 |
| 2,089,757 | Nieuwkamp | Aug. 10, 1937 |
| 2,601,227 | Shebel | June 24, 1952 |